(12) United States Patent
Mihara

(10) Patent No.: US 9,565,174 B2
(45) Date of Patent: Feb. 7, 2017

(54) INFORMATION PROCESSING SERVER SYSTEM, CONTROL METHOD, AND PROGRAM

(71) Applicant: CANON KABUSHIKI KAISHA, Tokyo (JP)

(72) Inventor: Makoto Mihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 14/286,715

(22) Filed: May 23, 2014

(65) Prior Publication Data

US 2014/0359702 A1 Dec. 4, 2014

(30) Foreign Application Priority Data

May 28, 2013 (JP) ................... 2013-111839

(51) Int. Cl.
*H04L 29/06* (2006.01)
*G06F 21/31* (2013.01)

(52) U.S. Cl.
CPC .............. *H04L 63/08* (2013.01); *G06F 21/31* (2013.01); *H04L 63/168* (2013.01)

(58) Field of Classification Search
CPC ...... H04L 63/00; H04L 63/02; H04L 63/0209; H04L 63/0281; H04L 63/04; H04L 63/0407; H04L 63/0428; H04L 63/08; H04L 63/0807; H04L 63/0815; H04L 63/0823; H04L 63/083; H04L 63/0884; H04L 63/101; H04L 63/102; H04L 63/104; H04L 63/14; H04L 63/1466; H04L 63/16; H04L 63/168; G06F 21/00; G06F 21/31; G06F 21/33; G06F 21/335; G06F 21/41; G06Q 20/00; G06Q 20/02; G06Q 20/023; G06Q 20/027; G06Q 20/04; G06Q 20/12; G06Q 20/38; G06Q 20/382
See application file for complete search history.

(56) References Cited

U.S. PATENT DOCUMENTS

| 6,047,268 | A * | 4/2000 | Bartoli | G06Q 20/02 705/35 |
| 7,457,778 | B2 * | 11/2008 | Li | G06Q 30/0641 705/39 |
| 8,745,718 | B1 * | 6/2014 | Dufel | H04L 63/0807 713/155 |
| 2005/0262026 | A1 * | 11/2005 | Watkins | G06Q 20/02 705/67 |
| 2006/0236382 | A1 * | 10/2006 | Hinton | H04L 63/0815 726/8 |
| 2011/0213688 | A1 * | 9/2011 | Santos | G06Q 30/04 705/34 |
| 2012/0011578 | A1 * | 1/2012 | Hinton | H04L 63/0815 726/8 |

(Continued)

FOREIGN PATENT DOCUMENTS

JP    4056390 B2    3/2008

Primary Examiner — Jung Kim
Assistant Examiner — Adrian Stoica
(74) Attorney, Agent, or Firm — Canon U.S.A., Inc. IP Division

(57) ABSTRACT

An information processing server system in which agreement to terms of service by a user is confirmed using a second authentication session different from a first authentication session used when a client uses the web service is provided.

9 Claims, 11 Drawing Sheets

(56) References Cited

U.S. PATENT DOCUMENTS

| | | | |
|---|---|---|---|
| 2012/0151568 A1* | 6/2012 | Pieczul | H04L 63/0815 726/8 |
| 2012/0173431 A1* | 7/2012 | Ritchie | G06Q 20/367 705/65 |
| 2013/0014243 A1* | 1/2013 | Chen | H04L 67/2804 726/8 |

* cited by examiner

FIG. 4

USER MANAGEMENT TABLE 1200

| USER ID 1201 | PASSWORD 1202 | TENANT ID 1203 | ROLE 1204 | TERMS-OF-SERVICE AGREEMENT INFORMATION 1205 | SESSION INFORMATION 1206 |
|---|---|---|---|---|---|
| Admin1 | ********* | 1001AA | CustomerAdmin | 2,3 | XXXX,04/16/2013 07:07 |
| User1 | ********* | 1001AA | Customer, Form | 2 | YYYY,04/16/2013 07:07 |
| User2 | ********** | 1001AA | Customer, Print | | |
| User3 | ********** | 1001AA | Customer, Form, Print | | |

FIG. 5A

LICENCE TABLE 1500

| TENANT ID 1501 | SALES TENANT ID 1502 | LICENSE 1503 | LICENSE COUNT 1504 |
|---|---|---|---|
| 1001AA | 101AA | Form | 20 |
| 1001AA | 101AA | Print | 20 |

FIG. 5B

TERMS-OF-SERVICE MANAGEMENT TABLE 1600

| TERMS-OF-SERVICE ID 1601 | SALES TENANT ID 1602 | LICENSE 1603 | REVISION 1604 | CONTENT 1605 |
|---|---|---|---|---|
| 1 | 101AA | Form | 1 | AGREE TO TERMS OF FORM SERVICE XX... |
| 2 | 101AA | Form | 2 | AGREE TO TERMS OF FORM SERVICE XX... |
| 3 | 101AA | Print | 1 | TERMS OF PRINT SERVICE ZZ. AGREE TO XX... |
| 4 | 102AA | Form, Print | 1 | TERMS OF FORM/PRINT SERVICE. AGREE TO XX... |

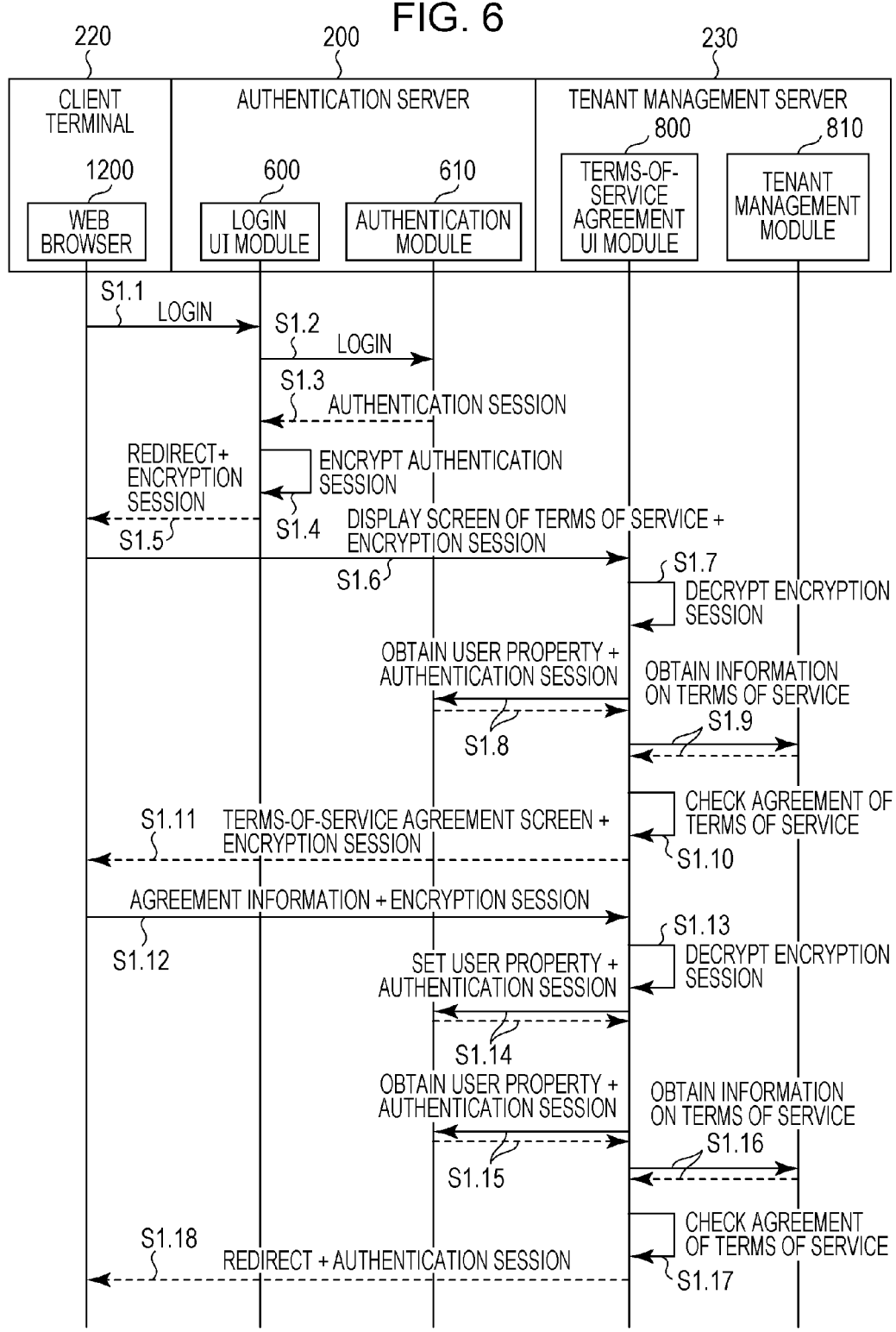

FIG. 11

| TEMPORARY SESSION MANAGEMENT TABLE 1300 ||
|---|---|
| TEMPORARY SESSION 1301 | AUTHENTICATION SESSION 1302 |
| TempSessionABCD | XXXX |
| TempSessionDCBA | YYYY |

INFORMATION PROCESSING SERVER SYSTEM, CONTROL METHOD, AND PROGRAM

BACKGROUND

Field

Aspects of the present invention generally relate to an information processing server system which starts use of a web service in accordance with agreement to terms of the web service, a control method, and a program.

Description of the Related Art

In recent years, business in which services are provided for customers using servers provided on the Internet, such as cloud services, has been widely provided. In such business, different services are provided, and a customer selects a desired one of the services and makes a contract of only the required service.

Furthermore, when such a service is provided for a certain customer company, a service provider newly generates a tenant to be assigned to the customer company. Furthermore, an initial user who manages the newly-generated tenant on the customer company side is generated and is registered in the tenant. An administrator of the customer company logs into the service as the generated initial user and adds the user to the assigned tenant, and in addition, performs required settings so that the customer company may start use of the service.

The user who actually uses the service is requested to agree to terms of service defined by the service provider and use of personal information when logging in the service for the first time. Only after agreeing to the terms of service and the use of personal information, the user may log in and use the service in some cases. As for the terms of service, the user may be requested to agree to different terms of service for different services or may be requested to agree to the same terms of service which are shared by different services so as to use all the services.

In general, access to a server protected by an authentication function is performed using a cookie after storing an authentication session representing that authentication is successfully performed as a result of login to the service in a web browser of a client as the cookie. When web pages provided by the server are to be accessed, the client transmits a cookie to the server. Then the server determines that the accesses to the web pages are performed by the same user and provides the services to the user. As disclosed in Japanese Patent No. 4056390, when a cookie of an authentication session is supplied to a web browser of a client, the web browser is allowed to access a web page protected by an authentication function.

When agreement to terms of service and use of personal information is requested to each user, the user performs login using a login screen of a server. The server obtains information on a service usable by the user and information on terms of service in which the user has agreed and provides a screen for making agreement to terms of service which are determined that the user has not agreed. When a result of an agreement by the user is supplied to the server through the agreement screen, the server requires a cookie of an authentication session so as to specify the user who has agreed the terms of service.

However, if the cookie of the authentication session is supplied to a web browser, it is possible that a web service becomes available without the agreement of the terms of service. Specifically, when the user directly specifies a URL of the service using the web browser while the agreement screen is displayed, the user may access and use the web service without the agreement to the terms of service.

SUMMARY OF THE INVENTION

Aspects of the present invention generally provide an information processing server system in which agreement to terms of service by a user is confirmed using an authentication session different from an authentication session used when a client uses a web service.

According to an aspect of the present invention, an information processing server system includes a generation unit configured to generate, based on a first authentication session generated after a user is authenticated and that is used when a client uses a web service, a second authentication session, a transmission unit configured to transmit the second authentication session to the client, and a reception unit configured to receive the second authentication session together with information representing agreement to terms of the web service from the client. The transmission unit transmits the first authentication session corresponding to the second authentication session to the client when it is determined that the user has agreed to the terms of the web service in accordance with the received information and the second authentication session.

Further features of the present disclosure will become apparent from the following description of exemplary embodiments with reference to the attached drawings.

BRIEF DESCRIPTION OF THE DRAWINGS

FIG. 4 is a diagram illustrating a configuration of a table managed by an authentication server.

FIGS. 5A and 5B are diagrams illustrating configurations of tables managed by a tenant management server.

FIG. 6 is a diagram illustrating a sequence of login and agreement to terms-of-service.

FIG. 11 is a diagram illustrating a configuration of a temporary session management table managed by an authentication server.

DESCRIPTION OF THE EMBODIMENTS

Exemplary embodiments will be described hereinafter with reference to the accompanying drawings.

In these embodiments, it is assumed that a form service for generating a form on the Internet and a print service for printing the generated form using an image forming apparatus are provided by a server on the Internet. Hereinafter, services, including the services described above, which provide functions thereof on the Internet, are referred to as "web services".

First Embodiment

Figure 1:
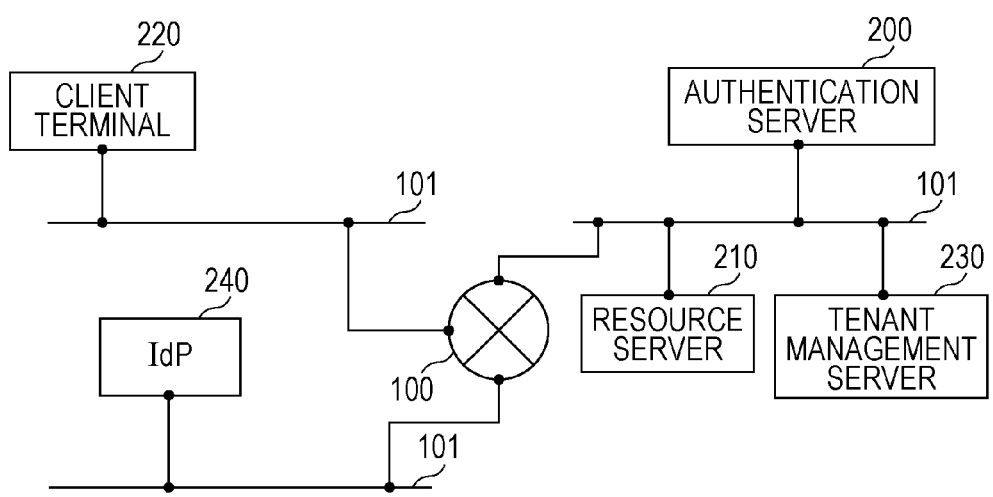
FIG. 1 is a diagram illustrating a system configuration.

A terms-of-service management system according to a first embodiment is realized on a network configured as illustrated in FIG. 1. A World Wide Web (WWW) system is constructed as a wide area network (WAN) 100 according to the present technique. Local area networks (LAN) 101 connect components to one another.

An authentication server 200 authenticates users. A resource server 210 provides web services including a form service and a print service. A single resource server may include a single web service or a plurality of web services. Furthermore, although a single server is provided as each of the servers, a plurality of servers may be provided as each of the servers. Therefore, the term "information processing server system" specifies at least one server. A client terminal 220 includes a web browser installed therein. A tenant management server 230 performs management of content of the terms of service and generation of an agreement screen. An identity provider (IdP) 240 of a security assertion markup language (SAML) for single sign-on is an authentication server provided separately from this system. Furthermore, the authentication server 200, the resource server 210, the client terminal 220, the tenant management server 230, and the IdP 240 are connected to each other through the WAN 100 and the LANs 101. Here, the authentication server 200, the resource server 210, the client terminal 220, the tenant management server 230, and the IdP 240 may be configured in respective LANs or may be configured in the same LAN. Furthermore, the authentication server 200, the resource server 210, and the tenant management server 230 may be configured in the same server.

Note that the information processing server system described above includes at least one login control server which performs a user authentication process and a resource server which provides a service when the user authentication process is successfully performed by the login control server. However, a configuration in which the servers are integrated as a single server is also assumed, and therefore, when the term "information processing server system" is used, it is not necessarily the case that the information processing server system which provides a plurality of services includes a plurality of servers. Furthermore, the information processing server system may include only the login control server or only the resource server.

Figure 2:
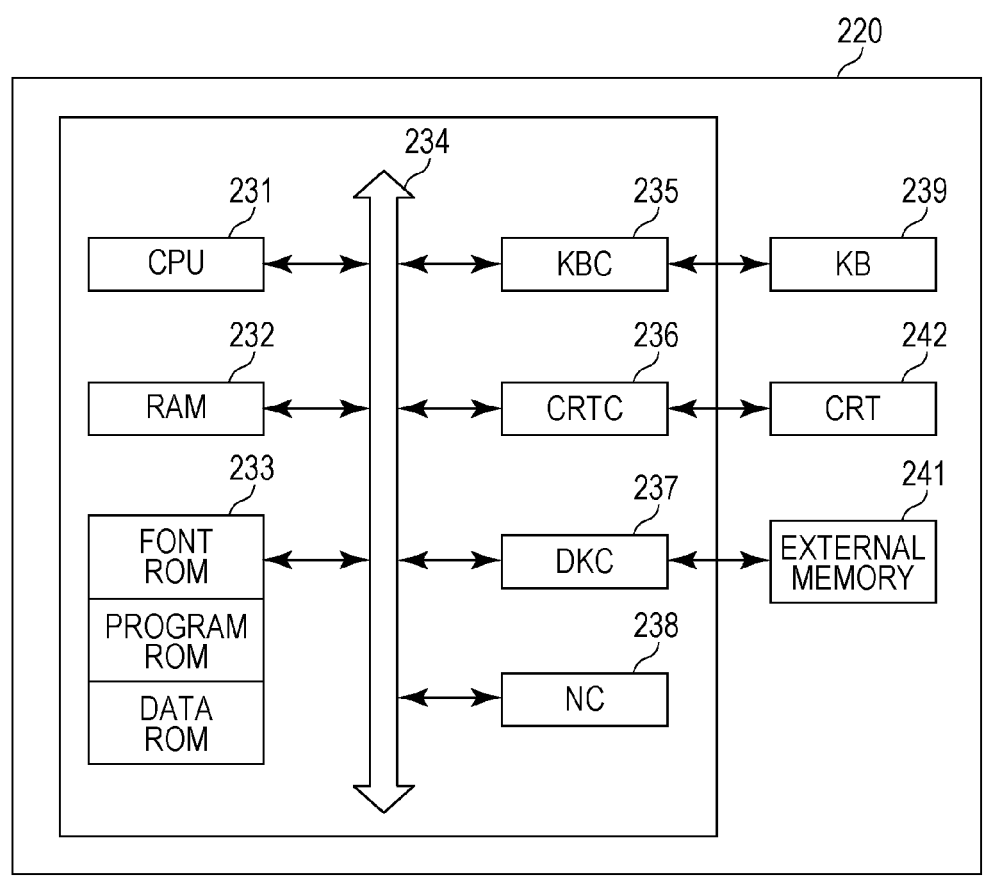
FIG. 2 is a diagram illustrating hardware configurations of devices.

FIG. 2 is a diagram illustrating a configuration of the client terminal 220 according to this embodiment. The server computers including the authentication server 200, the resource server 210, the tenant management server 230, and the IdP 240 have the same configurations. Here, a diagram of hardware blocks illustrated in FIG. 2 corresponds to a diagram of hardware blocks of general information processing apparatuses, and a hardware configuration of the general information processing apparatuses may be applied to the client terminal 220 and the server computers according to this embodiment.

In FIG. 2, a CPU 231 executes an OS and programs including applications which are stored in a ROM 233 for storing programs or which are loaded from an external memory 241 such as a hard disk (HD) to a RAM 232. Furthermore, the CPU 231 controls the blocks connected to a system bus 234. Here, the term "OS" is abbreviation of an operating system operating in a computer, and an operating system is referred to as an "OS" hereinafter. Processes of sequences which will be described hereinafter are realized when programs are executed. The RAM 232 functions as a main memory, a work area, and the like of the CPU 231. A keyboard controller (KBC) 235 controls key input performed by a keyboard 239 and a pointing device, not illustrated. A CRT controller (CRTC) 236 controls display of a CRT display 242. A disk controller (DKC) 237 controls data access in the external memory 241 such as a hardware (HD) storing various data. A network controller (NC) 238 executes a process of controlling communication with the server computers and other apparatuses connected through the WAN 100 or the LANs 101. In the description below, a main portion of hardware for execution performed by the server is the CPU 231 unless otherwise notified, and a main portion of software is application programs installed in the external memory 241.

Figure 3:
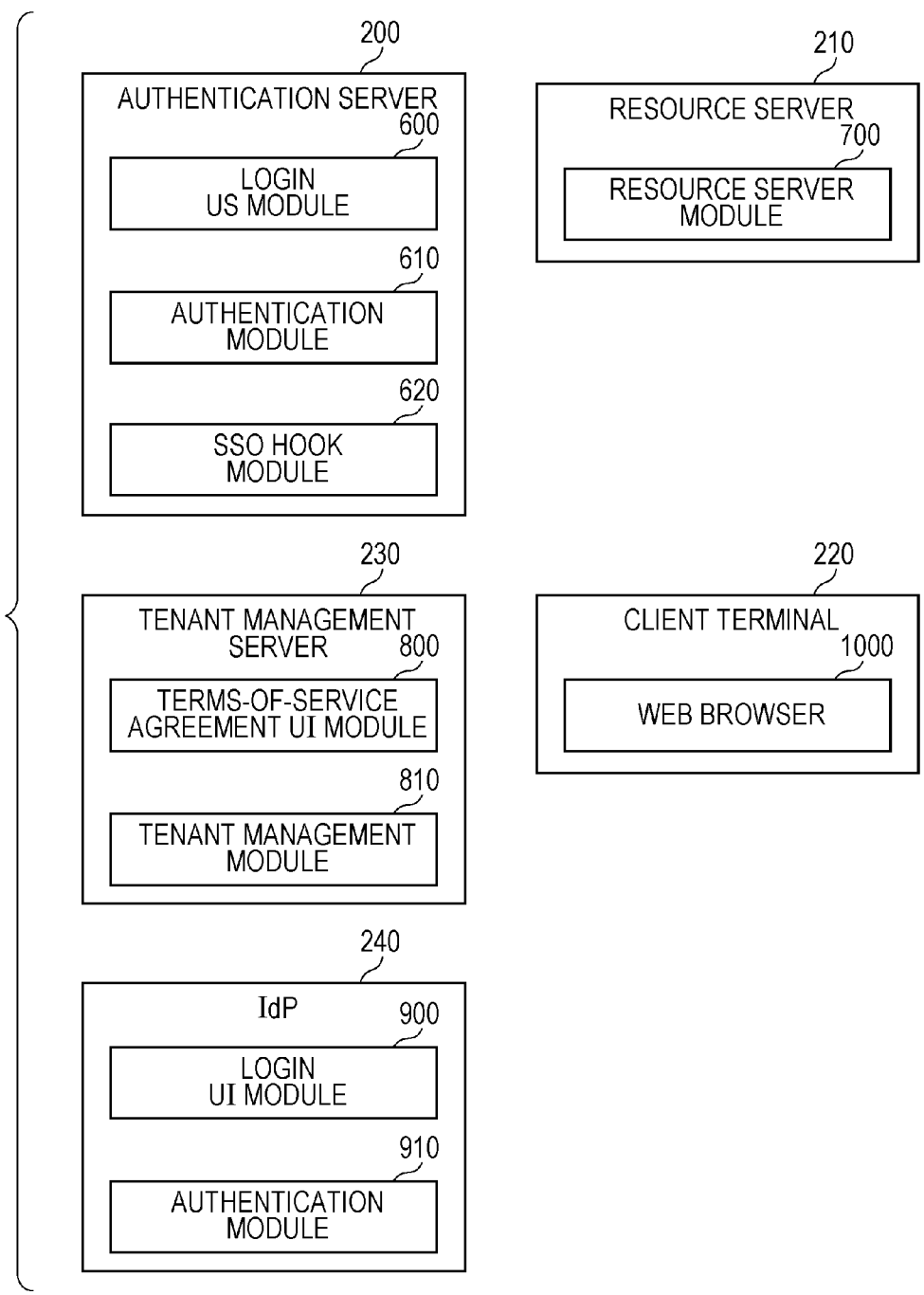
FIG. 3 is a diagram illustrating configurations of software modules.

FIG. 3 is a diagram illustrating configurations of modules of the authentication server 200, the resource server 210, the client terminal 220, the tenant management server 230, and the IdP 240. The authentication server 200 includes a login UI module 600, an authentication module 610, and an SSO hook module 620. The resource server 210 includes a resource server module 700. The client terminal 220 includes a web browser 1000 which is a user agent for using the WWW. The tenant management server 230 includes a terms-of-service agreement UI module 800 and a tenant management module 810. The IdP 240 includes a login UI module 900 and an authentication module 910.

FIG. 4 is a diagram illustrating a data table stored in an external memory by the authentication server 200. The data table may be stored in another server which may be communicated through the LAN 101 instead of the external memory of the authentication server 200. A user management table 1200 includes a user ID 1201, a password 1202, a tenant ID 1203, a role 1204, a terms-of-service agreement information 1205, and session information 1206. The authentication server 200 has a function of verifying a combination of information on the user ID 1201 and information on the password 1202, authenticating each user, and generating an authentication session. The client terminal 220 is allowed to access a web service by using the authentication session. The role 1204 represents information on an authority of each user. Here, "Customer Admin" represents an authority of an administrator, "Customer" represents an authority of general users, "Form" represents an authority for using the form service, and "Print" represents an authority for using the print service. Only the roles corresponding to "Form" and "Print" enable use of the corresponding web services. The terms-of-service agreement information 1205 represents terms of service to which each user has agreed. The session information 1206 is a region which stores generated authentication sessions. IDs of authentication sessions uniquely determined by the system and expiration dates of the authentication sessions are stored in the session information 1206.

FIGS. 5A and 5B are diagrams illustrating data tables stored in an external memory by the tenant management server 230. The data tables may be stored in another server which may be communicated through the LAN 101 instead of the external memory of the tenant management server 230. A license management table 1500 is illustrated in FIG. 5A. The license management table 1500 includes a tenant ID 1501, a sales tenant ID 1502, a license 1503, and a license count 1504. The license management table 1500 manages web services available for customer tenants. In the first embodiment, information representing that a customer tenant corresponding to a tenant ID 1501 of "1001AA" may use licenses 1503 of "Form" and "Print" corresponding to a license count 1504 of "20" provided by a sales tenant corresponding to a sales tenant ID 1502 of "101AA".

A terms-of-service management table 1600 is illustrated in FIG. 5B. The terms-of-service management table 1600 includes a terms-of-service ID 1601, a sales tenant ID 1602, a license 1603, a revision 1604, and content 1605. The terms-of-service management table 1600 manages terms of service corresponding to licenses for individual sales tenants which sell the licenses. The terms-of-service ID 1601 is used to uniquely identify terms of service in the system. The sales tenant ID 1602 manages tenants which have sold licenses. The license 1603 manages licenses corresponding to the terms of service to be displayed. In this embodiment, various types of terms of service including terms of service for a "Form" license, terms of service for a "Print" license, and terms of service shared by the "Form" license and the "Print" license are defined, and the revision 1604 manages revisions of the various types of terms of service. Information on the revision 1604 is stored since, when terms of service to which the user has agreed is revised, a process of requesting agreement to the terms of service which has been revised again is realized. The content 1605 manages content of terms of service to which the user is required to agree in practice.

A sequence of processes according to this embodiment in which the user performs login from a web page and agrees to terms of service and use of a web service is started will be described with reference to FIG. 6. This sequence is performed when the user logs in the information processing server system using the web browser 1000 of the client terminal 220.

First, the web browser 1000 accesses the login UI module 600 of the authentication server 200 so as to perform login (S1.1). In this process, the system user inputs user authentication information including a user ID and a password. The login UI module 600 transmits the user ID and the password to the authentication module 610 (S1.2). After checking matching of the received user ID and the received password with reference to data included in the user management table 1200 and determining that authentication is successfully performed, the authentication module 610 generates an authentication session. The authentication module 610 stores the generated authentication session in the session information 1206 of the user management table 1200, and thereafter, transmits a response to the login UI module 600 (S1.3). The login UI module 600 encrypts the authentication session obtained in step S1.3 (S1.4). An encryption key used for the encryption is shared only by the login UI module 600 and the terms-of-service agreement UI module 800. Therefore, the encryption and decryption of the authentication session may be performed only by the login UI module 600 and the terms-of-service agreement UI module 800. The login UI module 600 sets an encryption session to a cookie and transmits a response representing redirection to a terms-of-service agreement screen to the client terminal 220 (S1.5).

When receiving an instruction for redirection, the web browser 1000 transmits a request for obtaining the terms-of-service agreement screen to the terms-of-service agreement UI module 800 of the tenant management server 230. Simultaneously, the web browser 1000 also transmits information on the encryption session (S1.6). The terms-of-service agreement UI module 800 obtains the encryption session from the request supplied from the web browser 1000 and performs a decryption process so as to obtain information on the authentication session (S1.7). The terms-of-service agreement UI module 800 transmits the obtained information on the authentication session to the authentication module 610 and obtains a user property (S1.8). The authentication module 610 specifies a user corresponding to the authentication session from the session information 1206 of the user management table 1200 and obtains data including the user ID 1201, the password 1202, the tenant ID 1203, the role 1204, and the terms-of-service agreement information 1205. The authentication module 610 transmits the obtained information to the terms-of-service agreement UI module 800 as a response (S1.8). The terms-of-service agreement UI module 800 inquires of the tenant management module 810 about information on the tenant ID 1203 obtained in step S1.8 and obtains information on terms of service (S1.9). The tenant management module 810 obtains information on terms of service in which agreement is required in a target tenant with reference to the license management table 1500 and the terms-of-service management table 1600. For example, when a tenant ID of "1001AA" is supplied, information on terms of service corresponding to a terms-of-service ID 1601 of "2" (terms of service of a latest revision of the "Form" license sold by the tenant having the sales tenant ID 1502 of "101AA") and a terms-of-service ID 1601 of "3" (terms of service of a latest revision of the "Print" license sold by the tenant having the sales tenant ID 1502 of "101AA") are obtained. The tenant management module 810 transmits the obtained information on the terms of service to the terms-of-service agreement UI module 800 as a response (S1.9). The terms-of-service agreement UI module 800 checks whether terms of service in which agreement is required to be made exist using the user property obtained in step S1.8 and the information on the terms of service obtained in step S1.9 (S1.10).

Figure 7:
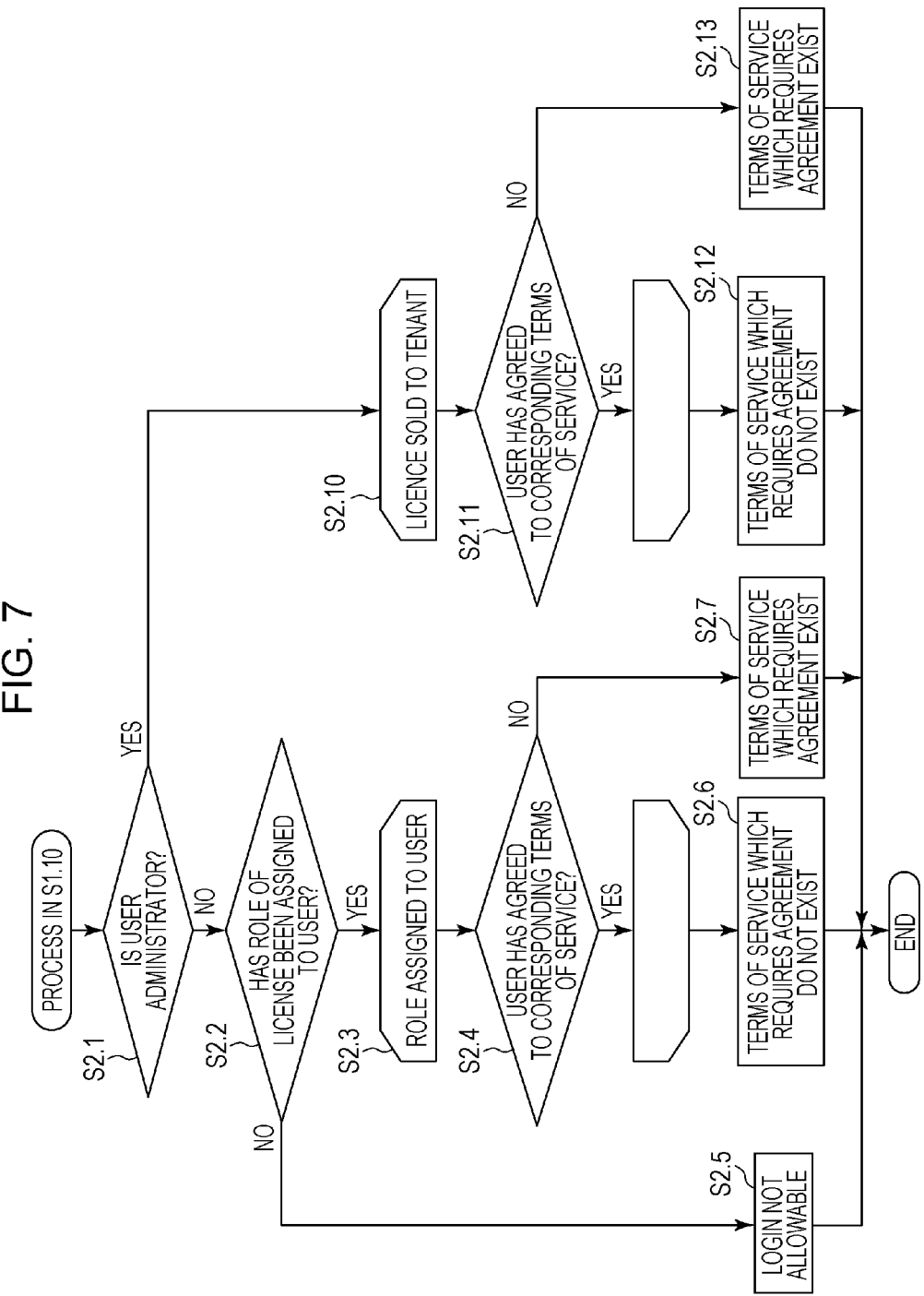
FIG. 7 is a flowchart illustrating a process of determining whether agreement to the terms of service is required.

Here, a flow of a process of determining whether terms of service in which agreement is required to be made exist in step S1.10 is described in detail with reference to FIG. 7. In this process, different methods of the determination as to whether terms of service in which agreement is required to be made exist are employed between the administrator and a general user. The general user makes the determination in accordance with an appropriate role which is assigned to the user to use a web service corresponding to a license assigned to the user. The administrator may not have a role of a specific web service such as user management and tenant management in some cases. This is because the administrator corresponds to an account for managing users of the same tenant who use web services in practice instead of an account for using web services. Therefore, even when the administrator does not have a role corresponding to a license, the administrator is required to agree to terms of service so as to log into the system. Accordingly, the administrator makes the determination as to whether terms of service in which agreement is required to be made exist in accordance with a determination as to whether a license sold by a tenant to whom the administrator belongs exists.

In step S1.10, it is determined whether the user is the administrator or the general user in accordance with the user property (S2.1). When the user is a general user, the process proceeds to step S2.2 and the determination as to whether terms of service in which agreement is required to be made exist is made in accordance with a role assigned to the user. Hereinafter, a description will be made on the basis of information on users defined by the user management table 1200. In step S2.2, it is determined whether a role corresponding to a license has been assigned to the user. When the role has not been assigned, the process proceeds to step S2.5 where the user is not allowed to log in and use of the system is banned. In a case of "User 2", the role of "Print" is assigned, and therefore, the process proceeds to step S2.3. In step S2.3, a loop process is performed a number of times corresponding to the number of roles assigned to the user. In the case of "User 2", the loop process is performed once for the role of "Print", and in a case of "User 3", the loop process is performed twice for the roles of "Form" and "Print". In step S2.4, it is determined whether the user has agreed to corresponding terms of service. In the case of "User 2", since the "User 2" belongs to the tenant ID of "1001AA", according to information included in the license management table 1500, a license of "Print" which is a web service which is associated with a tenant corresponding to the sales tenant ID of "101AA" and which is sold to the target tenant is specified. Furthermore, according to information included in the terms-of-service management table 1600, terms of service corresponding to the terms-of-service ID 1601 of "3" are specified. Finally, since information on agreement to the terms of service has not been recorded in the terms-of-service agreement information 1205 corresponding to "User 2", a process to be performed when terms of service in which agreement is required to be made exist is performed in step S2.7. As with the case of "User 1", when the user has agreed to corresponding terms of service, a process to be performed when terms of service in which agreement is required to be made does not exist is performed in step S2.6. By this process, a process of determining whether a process of agreeing to terms of service is required when the user is a general user is completed.

The description returns to step S2.1. When the user is an administrator, the process proceeds to step S2.10 where terms of service are determined in accordance with a license sold to a tenant to which the user belongs. In web service S2.10, a loop process is performed by the number of times corresponding to licenses assigned to the tenant to which the user belongs. In a case of "Admin 1", since "Admin 1" belongs to a tenant having the tenant ID of "1001AA", according to the information included in the license management table 1500, the loop process is performed twice, that is, the number of times corresponding to the number of licenses, that is, the "Form" license and the "Print" license. By this process, even the administrator to which any role is not assigned may obtain appropriate terms of service. In step S2.11, it is determined whether the user has agreed to corresponding terms of service. In the case of "Admin 1", according to the information included in the license management table 1500, the sales tenant ID of "101AA" is specified. Furthermore, according to the information included in the terms-of-service management table 1600, terms of service corresponding to the terms-of-service IDs 1601 of "2" and "3" are specified. Finally, it is determined whether information on agreement to the terms of service has been recorded in the terms-of-service agreement information 1205 corresponding to "Admin 1". Since the agreement has been made in this embodiment, a process to be performed when terms of service in which agreement is required to be made does not exist in step S2.12 is entered. When the agreement to the terms of service has not been made, a process to be performed when terms of service in which agreement is required to be made exist in step S2.13 is entered. By this process, a process of determining whether a process of agreeing to terms of service is required when the user is an administrator is completed. The flow of the detailed process of determining whether terms of service in which agreement is required to be made exist performed in step S1.10 has been described hereinabove.

Figure 8A:
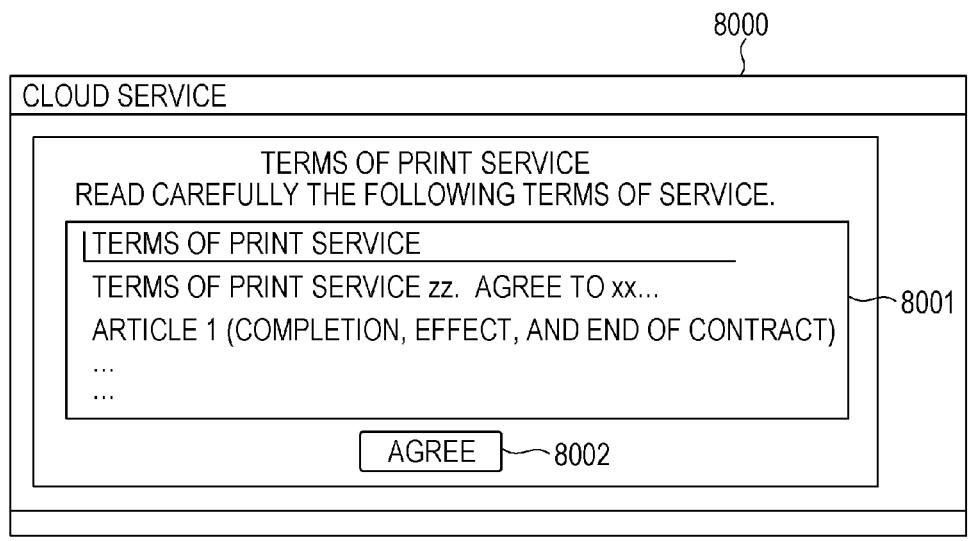
FIGS. 8A and 8B are diagrams illustrating screens relating to the terms of service.
Figure 8B:
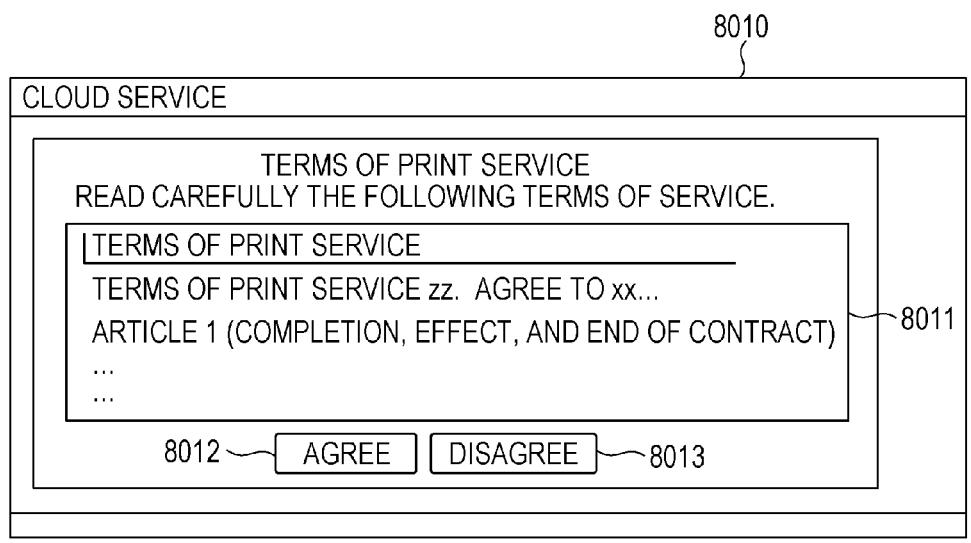

The description returns to the process of step S1.10 onwards in FIG. 6. When terms of service in which agreement is required to be made exist, the terms-of-service agreement UI module 800 generates a terms-of-service agreement screen using the data of the content 1605, sets the encryption session generated in step S1.4 to a cookie, and transmits a response to the client terminal 220. FIGS. 8A and 8B are diagrams illustrating the terms-of-service agreement screens 8000 and 8010 according to this embodiment. FIG. 8A is a diagram illustrating an example of a screen when only agreement to terms of service is required. Since the system is not allowed to be used without making agreement to the terms of service, only a button representing agreement may be provided in the screen. If the user does not wish to agree to the terms of service, the process is terminated by terminating the web browser 1000 or the like. FIG. 8B is a diagram illustrating an example of a screen when agreement or disagreement to terms of service is required to be made. In a case where a certain process is to be performed (for example, display of a message) when disagreement is selected, this screen is used. A process to be performed when agreement is selected is the same as that described with reference to FIG. 8A.

The data of content 1605 is displayed in regions 8001 and 8011 and an agreement button is provided in regions 8002 and 8012. Furthermore, a disagreement button is provided in a region 8013. When one of the agreement buttons 8002 and 8012 included in terms-of-service agreement screens 8000 and 8010, respectively, and the disagreement button 8013 included in the terms-of-service agreement screen 8010 is pressed, the web browser 1000 transmits a request for notifying the web browser 1000 of agreement information to the terms-of-service agreement UI module 800 of the tenant management server 230. Here, information on the encryption information is also transmitted (S1.12). The terms-of-service agreement UI module 800 obtains agreement information from the request supplied from the web browser 1000. When the agreement has not been made, the encryption session is deleted and an error screen is supplied to the client as a response. When the agreement has been made, the encryption session is obtained from the request and a decryption process is performed so as to obtain information on the authentication session (S1.13). The terms-of-service agreement UI module 800 transmits the obtained authentication session and an ID of the terms of service corresponding to the agreement to the authentication module 610 and sets the user property (S1.14).

The authentication module 610 specifies a user corresponding to the authentication session from the session information 1206 of the user management table 1200 and sets the ID of the terms of service to the terms-of-service agreement information 1205. The terms-of-service agreement UI module 800 further determines whether terms of service in which agreement is required to be made exist in step S1.15, S1.16, and S1.17. This determination is performed by a process the same as those in step S1.8, S1.9, and S1.10. When it is determined that terms of service in which agreement is required to be made does not exist in step S1.17, the terms-of-service agreement UI module 800 sets an authentication session to a cookie and notifies the client terminal 220 of redirection to a web service provided by the resource server 210 as a response (S1.18). Only after the user agrees to all the terms of service, the client terminal 220 may obtain the authentication session from the server. By this, access to web services which require the authentication session is enabled, and the client terminal 220 may start use of the web services of the information processing server system.

The sequence of processes in which the user performs login from a web page, agrees to terms of service, and starts use of a web service according to this embodiment has been described hereinabove.

Second Embodiment

As a second embodiment, a terms-of-service agreement method in an environment in which an information processing server system of the present disclosure serves as a service provider (SP) which realizes an IdP of another information processing server system and single sign-on (SSO) by the SAML will be described. It is assumed that an authentication server 200 and an IdP 240 have all settings required for the SSO by the SAML set in advance. Furthermore, an SSO hook module 620 is set so as to hook all responses to access to web pages of the authentication server 200. The setting of hook is performed on a web server which controls an HTTP function of the authentication server 200. General web servers are capable of freely adding a process in course of a process of the HTTP function by adding an external module. The SSO hook module 620 is generated as an external module and incorporated in a process of the web server performed at a timing when all HTTP responses are returned to a client terminal 220.

A method for a series of processes in which a user performs login from a web page of the IdP, the client terminal 220 accesses the information processing server system by the SSO of the SAML and displays a screen for agreement to terms of service is performed will be described with reference to FIG. 9. First, a web browser 1000 accesses a login UI module 900 of the IdP 240 so that login is performed (S3.1). The login UI module 900 performs a login process and generates an SAML response. An SAML response generated by a general IdP includes information for identifying an authenticated user and the like and further has an electronic signature. The login UI module 900 transmits the SAML response along with an instruction for redirection to the system to the client terminal 220. A web browser 1000 of the client terminal 220 transmits the SAML response to an authentication module 610 of an authentication server 200 and simultaneously transmits an SAML verification request to the authentication module 610. The authentication module 610 verifies whether the received SAML response is appropriate. In this verification, it is determined whether the electronic signature of the SAML response has been added by the IdP 240 set in advance, and thereafter, information for identifying a user included in the SAML response is obtained. Furthermore, in accordance with information on mapping of a user of the IdP 240 set in advance and a user of the information processing server system, a user ID obtained from the SAML response is converted into a user ID of the user of the information processing server system so that a login is permitted and an authentication session is generated. The authentication module 610 stores the generated authentication session in a session information 1206 of a user management table 1200, and thereafter, intends to transmit a response to the client terminal 220 (S3.4). Here, since the SSO hook module 620 of the authentication server 200 hooks all responses from the authentication server 200, the response in step S3.4 is also hooked. The SSO hook module 620 determines whether the hooked response corresponds to an SAML verification success response (S3.5).

Figure 10:
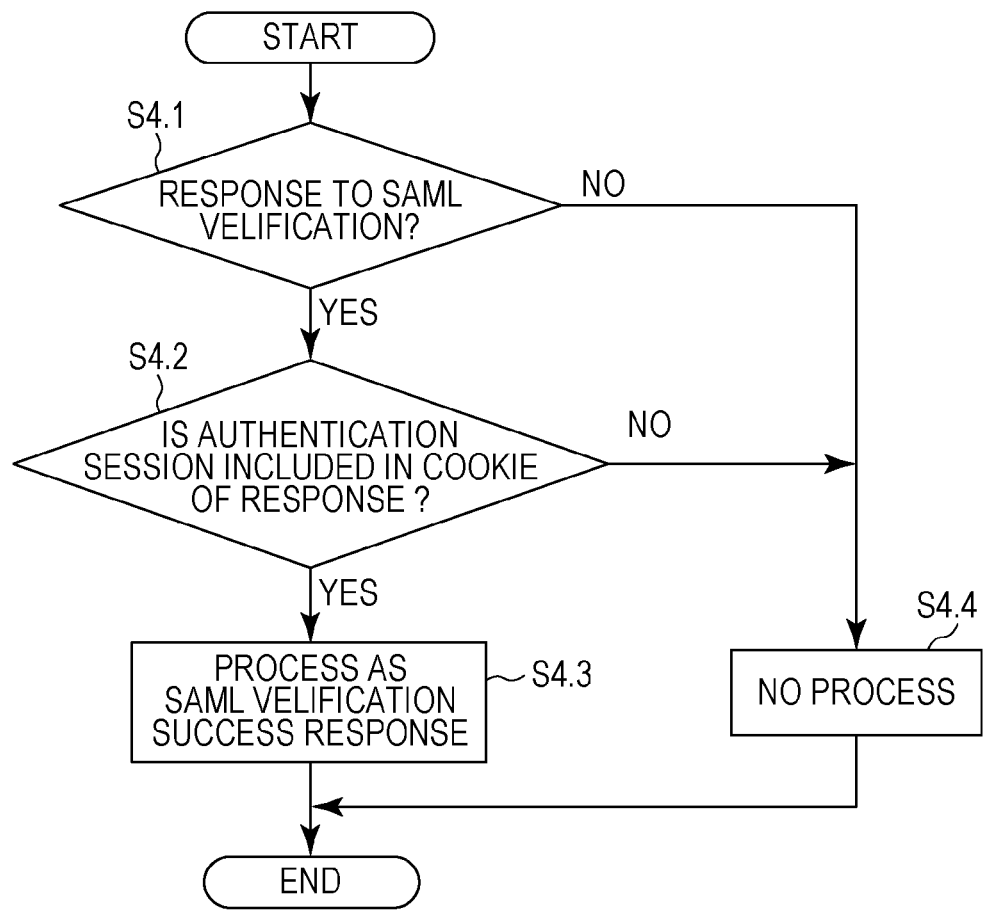
FIG. 10 is a flowchart illustrating a process of determining an SAML verification success response.

A detailed flow of the process in step S3.5 will be described with reference to FIG. 10. In step S4.1, it is determined whether the hooked response corresponds to a response to an SAML verification request. As described above, the SSO hook module 620 is executed on processes of all responses from the authentication server 200, and therefore, a response to a login, for example, is also hooked. Accordingly, a response for SAML verification is required to be specified in all the responses. The SSO hook module 620 stores a URL used for the SAML verification. Using the URL, it is determined whether the hooked response corresponds to a request of the URL. For example, in a case where the SSO hook module 620 stores a URL of "/auth/Saml/SP/ SSO/Post" for the SAML verification, it is determined whether the hooked response is a response to a request of the URL. When matching to the URL fails in step S4.1, the process proceeds to step S4.4 where the SSO hook module 620 performs nothing. When the matching to the URL is successfully performed in step S4.1, the process proceeds to step S4.2 where it is determined whether a cookie of the response includes an authentication session. When the SAML verification is successfully performed, an authentication session for accessing the system is set to a cookie of a response to be supplied to the client terminal 220, and therefore, a determination as to whether the SAML verification is successfully performed is made by a determination as to whether the authentication session is included in the cookie. When the SAML verification fails, the cookie does not include an authentication session, and therefore, the process proceeds to step S4.4. When an authentication session is included, the process proceeds to step S4.3 where a certain process is performed as a SAML verification success response.

Figure 9:
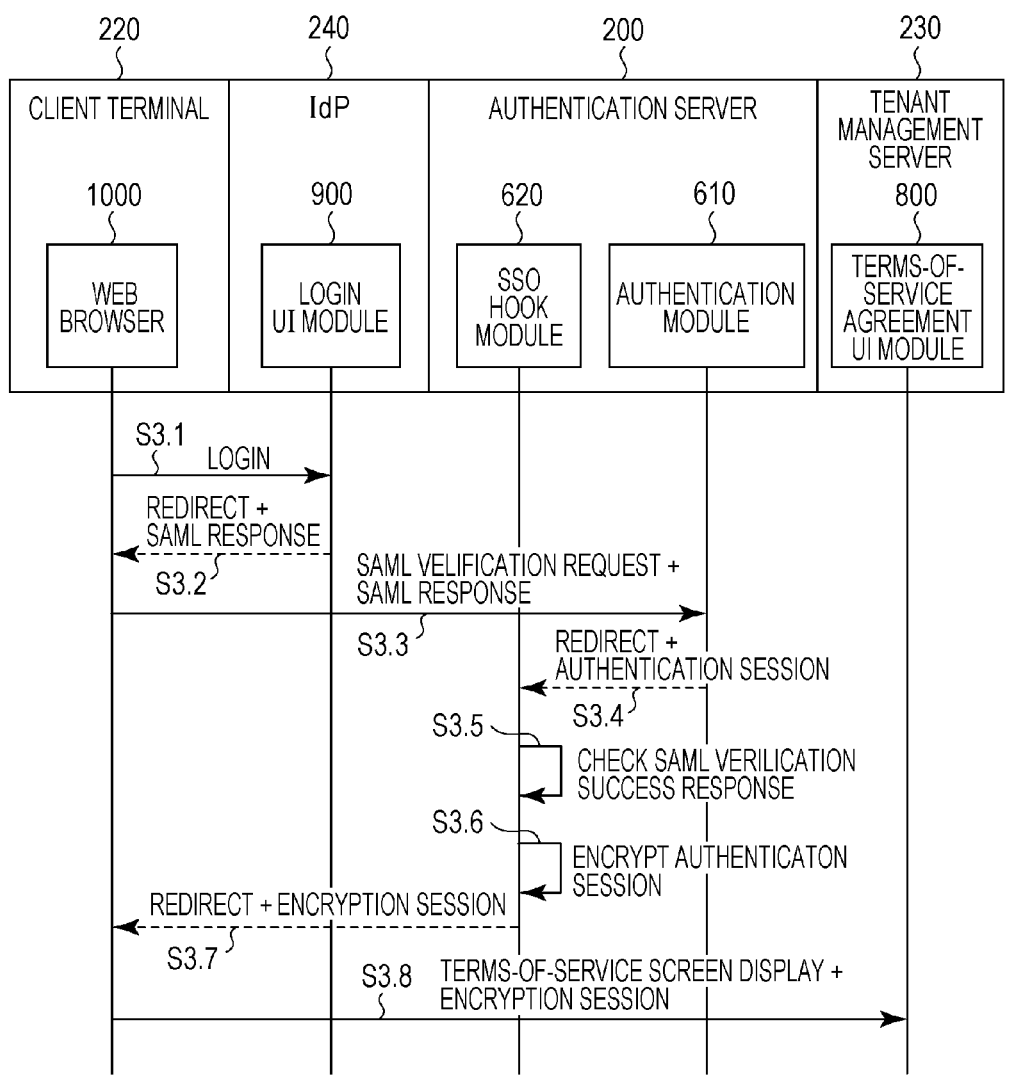
FIG. 9 is a diagram illustrating a sequence of single sign-on and display of a terms-of-service agreement screen.

The SSO hook module 620 performs a process of encrypting the authentication session in step S3.6 of FIG. 9 as the certain process of the SAML verification success response (S4.3). An encryption key used in this encryption is the same as that used in the login UI module 600 and the terms-of-service agreement UI module 800. In step S3.6, the SSO hook module 620, first, performs obtainment and deletion of the authentication session from the cookie of the SAML verification success response. Subsequently, the obtained authentication session is encrypted and set to the cookie of the response. Furthermore, a URL of a destination of redirection to a web service which is obtained after the SAML verification is successfully performed, which is set by the process of the SAML verification, and which is included in the response is replaced by a URL for display of a terms-of-service agreement screen. After the process in step S3.6, the SSO hook module 620 returns the response to the client terminal 220 (S3.7). When receiving the instruction for redirection, the web browser 1000 transmits a request for obtaining the terms-of-service agreement screen to the terms-of-service agreement UI module 800 of a tenant management server 230. Simultaneously, the web browser 1000 also transmits information on the encryption session (S3.8).

The sequence of processes in which the user performs login from a web page of the IdP and accesses the system by SSO of the SAML so that the terms-of-service agreement screen is displayed has been described hereinabove. The process in step S3.8 onwards is the same as that in step S1.6 onwards of FIG. 6, and even when the SAML SSO is used in cooperation, use of a web service may be started after agreement to terms of service is made. Consequently, although the client terminal 220 performs redirection to a web service by the SAML so as to receive the service in the related art, as a result of access to the URL for displaying the terms-of-service agreement screen, the user may use the web service through the client terminal 220 only when the user agrees to the terms of service, and accordingly, the web service may be appropriately provided.

Third Embodiment

In a third embodiment, a form of a method different from the method for using an authentication session after encrypting the authentication session so that an encryption session is obtained will be described. In this method, an authentication server 200 generates and stores a temporary session associated with an authentication session, and agreement to terms of service may be made without encrypting the authentication session.

FIG. 11 is a diagram illustrating a data table stored in an external memory by the authentication server 200. The data table may be stored in another server which may be communicated through the LAN 101 instead of the external memory of the authentication server 200. A temporary session management table 1300 includes a temporary session 1301 and an authentication session 1302. The temporary session 1301 stores IDs of temporary sessions uniquely identified in a system.

In the third embodiment, the following process is performed instead of the authentication session encryption process in steps S1.4 and S3.6 of the first and second embodiment. First, a login UI module 600 or an SSO hook module 620 notifies the authentication server 200 of an authentication session when performing the process in step S1.4 or step S3.6 so as to request generation of a temporary session. The authentication server 200 which has received the request generates a temporary session, associates the temporary session with information on the authentication session, stores the data in the temporary session management table 1300, and transmits the temporary session as a response. The login UI module 600 or the SSO hook module 620 which has received the temporary session uses the temporary session hereafter instead of an encryption session. Next, the following process is performed instead of the encryption session decryption process performed in step S1.7 and step S1.13 of the first embodiment or the second embodiment. A terms-of-service agreement UI module 800 notifies the authentication server 200 of the temporary session when performing the process in step S1.7 and step S1.13 and requests obtainment of an authentication session. The authentication server 200 which has received the request obtains an authentication session corresponding to the received temporary session from the temporary session management table 1300 and transmits the authentication session as a response. The terms-of-service agreement UI module 800 which has received the authentication session uses the authentication session obtained from the temporary session hereafter instead of a decrypted authentication session. The method different from the method for using an authentication session after encrypting the authentication session so that an encryption session is obtained has been described hereinabove.

An information processing server system capable of determining that a user agrees to terms of service using an authentication session different from an authentication session used by a client for use of a web service is provided.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-111839 filed May 28, 2013, which is hereby incorporated by reference herein in its entirety.

What is claimed is:

1. An information processing server system having a tenant management server and a first authentication server, the information processing server system, comprising:
a receiving unit configured to receive a SAML response generated when a user is authenticated by a second authentication server that is in an SSO (Single Sign On) cooperative relation to the first authentication server;
an HTTP response transmission unit configured to, in a case where the SAML response is verified to be valid, generate a first authentication session, and transmit the generated first authentication session to a client;
a hooking unit configured to hook an HTTP response to be transmitted to the client by the HTTP response transmission unit, confirm whether the first authentication session is included in the HTTP response or not, and acquire the first authentication session contained in the hooked HTTP response if the HTTP response has been confirmed to contain the first authentication session;
a generation unit configured to generate a second authentication session by encrypting the first authentication session generated after authentication of a user, and the first authentication session is used when a client uses a web service;
a transmission unit configured to transmit the second authentication session to the client; and
a reception unit configured to receive the second authentication session together with information representing agreement to terms of the web service from the client,
wherein the transmission unit transmits the first authentication session corresponding to the second authentication session to the client when it is determined that the user has agreed to the terms of the web service in accordance with the received information and the second authentication session.

2. The information processing server system according to claim 1, further comprising:
a provision unit configured to provide a screen for agreement to the terms of the web service or a plurality of screens for agreement to terms of web services available for an authenticated user,
wherein the transmission unit transmits the first authentication session corresponding to the second authentication session to the client when it is determined that the authenticated user has agreed to all the terms of web services available for the authenticated user.

3. The information processing server system according to claim 2, wherein the provision unit provides a screen for agreement to terms of the web service associated with a tenant of the user when any web service is not available for the authenticated user.

4. The information processing server system according to claim 1, wherein
the generation unit generates the second authentication session by encrypting the first authentication session, and
the transmission unit decrypts the second authentication session received by the reception unit and transmits the first authentication session obtained by the decryption to the client.

5. A method for controlling an information processing server system having a tenant management server and a first authentication server, the method comprising:
receiving an SAML response generated when a user is authenticated by a second authentication server that is in an SSO (Single Sign On) cooperative relation to the first authentication server;
in a case where the SAML response is verified to be valid, generating a first authentication session, and transmitting the generated first authentication session to a client;
hooking the HTTP response to be transmitted to the client by an HTTP response transmission unit, confirm whether the first authentication session is included in the HTTP response or not, and acquire the first authentication session contained in the hooked HTTP response if the HTTP response has been confirmed to contain the first authentication session;
generating a second authentication session by encrypting the first authentication session generated after authentication of a user, and the first authentication session is used when a client uses a web service;
transmitting the second authentication session to the client; and
receiving the second authentication session together with information representing agreement to terms of the web service from the client,
wherein, the first authentication session corresponding to the second authentication session is transmitted to the client when it is determined that the user has agreed to the terms of the web service in accordance with the received information and the second authentication session.

6. The method according to claim 5, further comprising:
providing a screen for agreement to the terms of the web service or a plurality of screens for agreement to terms of web services available for an authenticated user,
wherein, the first authentication session corresponding to the second authentication session is transmitted to the client when it is determined that the authenticated user has agreed to all the terms of web services available for the authenticated user.

7. The method according to claim 6, wherein
a screen for agreement to terms of the web service associated with a tenant of the user is provided when any web service is not available for the authenticated user.

8. The method according to claim 5, wherein
the second authentication session is generated by encrypting the first authentication session, and
the second authentication session is decrypted and the first authentication session obtained by the decryption is transmitted to the client.

9. A non-transitory computer-readable storage medium that stores computer executable instructions that cause a computer to execute a method for controlling an information processing server system having a tenant management server and a first authentication server, the method comprising:
receiving an SAML response generated when a user is authenticated by a second authentication server that is in an SSO (Single Sign On) cooperative relation to the first authentication server;
in a case where the SAML response is verified to be valid, generating a first authentication session, and transmitting the generated first authentication session to a client;
hooking the HTTP response to be transmitted to the client by an HTTP response transmission unit, confirm whether the first authentication session is included in the HTTP response or not, and acquire the first authentication session contained in the hooked HTTP response if the HTTP response has been confirmed to contain the first authentication session;
generating a second authentication session by encrypting the first authentication session generated after authentication of a user, and the first authentication session is used when a client uses a web service;
transmitting the second authentication session to the client; and
receiving the second authentication session together with information representing agreement to terms of the web service from the client,
wherein, the first authentication session corresponding to the second authentication session is transmitted to the client when it is determined that the user has agreed to the terms of the web service in accordance with the received information and the second authentication session.

* * * * *